March 24, 1931.  C. DOERING  1,797,856
SANDWICH LOAF
Filed Nov. 23, 1927
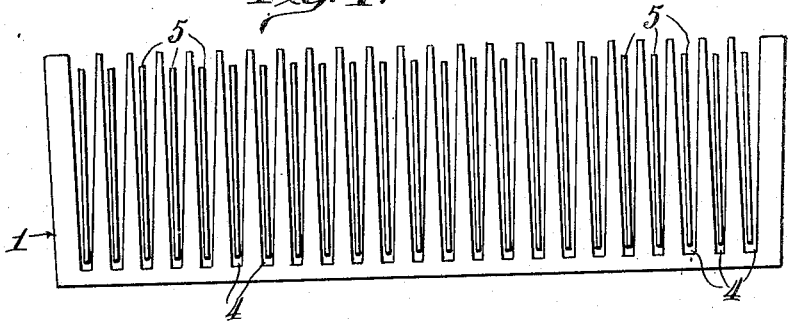
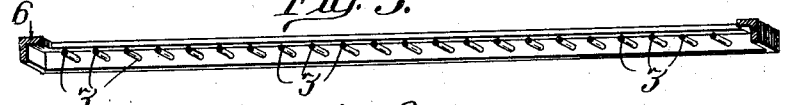
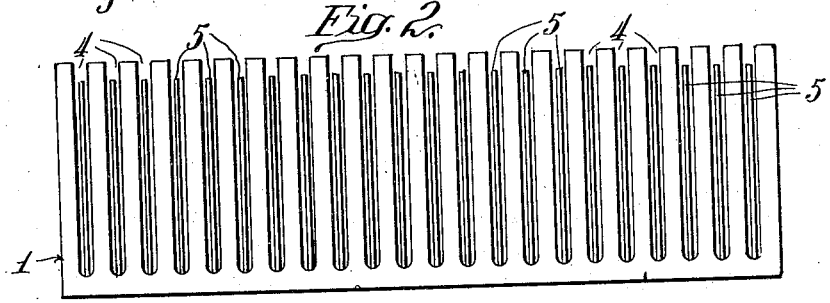
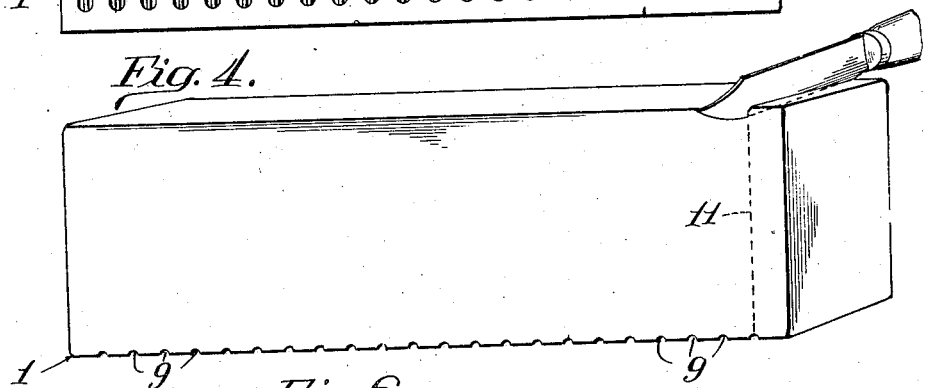
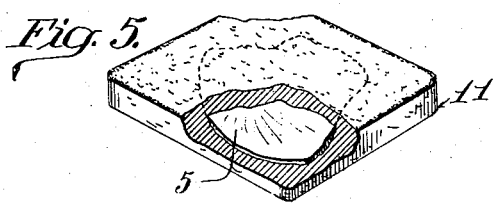
Inventor
Charles Doering
By Rudolph Wm. Lotz
Attorney Patented Mar. 24, 1931

1,797,856

UNITED STATES PATENT OFFICE

CHARLES DOERING, OF CHICAGO, ILLINOIS

SANDWICH LOAF

Application filed November 23, 1927. Serial No. 235,189.

This invention relates to the production of baked loaves, such as bread, cake and the like, so formed and filled as to provide a predetermined number of slices, each of which contains a slice of meat, cheese, fish or other substance completely encased in the baked resultant of the dough, to thus, in the case of bread, provide sandwish loaves, the slices of which constitute individual sandwiches the filler whereof, by virtue of being subjected to the high temperature necessary for baking, is completely sterilized.

The invention resides in the method of producing the loaf as well as in the product of said method.

The main object of the invention is to provide what I term a sandwich loaf which, when baked, may be very rapidly and conveniently cut to provide sandwiches which are ready to eat and afford thoroughly sterilized food which need not be touched by the human hand before being served to the consumer, a further advantage of the invention being the saving of labor in producing sandwiches in restaurants and permitting of very prompt service to patrons.

In the accompanying drawings I have illustrated several steps of the method and the ultimate products of the same. In said drawings:

Figure 1 is a view in side elevation of a loaf of dough in condition to receive slices of cheese, meat or other desired filler.

Figure 2 is a similar view showing the filler slices inserted in the loaf which is now ready to be placed in the baking pan.

Figure 3 is a sectional view of a tool adapted for producing the pockets of the loaf shown in Figure 1.

Figure 4 is a perspective view of the baked loaf.

Figure 5 is a perspective view, partly broken away, of a sandwich slice cut from the loaf shown in Figure 4.

Figure 6 is a fragmentary section of the bottom portion of a pan adapted to receive the unbaked loaf shown in Figure 2.

In carrying out the invention I provide a suitable dough possessing the usual characteristics of ordinary bread dough made of white, rye, whole wheat, whole rye flour, etc. The dough is then formed into loaves 1 of a size or sizes adapted to be received in the pan or pans 2 of corresponding sizes.

Each loaf 1 after being formed in any suitable manner, is subjected to the slicing action of a dull instrument such as a wire 3 of a gauge or diameter sufficiently large to provide a recess 4 in the loaf of dough of a depth and width sufficient to receive a slice 5 of cheese, meat, or other filler. Preferably a number of parallel equally spaced wires 3 are mounted in a frame 6 of a width and length greater than that of the loaf and which may be pressed down upon the latter to simultaneously form all of the recesses 4. The slices 5, which are preferably of a width and length only slightly less than the width and depth of the loaf of dough, are now inserted in the several recesses or pockets 4 and the loaf then placed in the pan 2. The bottom of the latter is provided with ribs 8 spaced from each other equidistantly with the spacing of the wires 3 and arranged with respect to the latter to provide grooves 9 in the bottom of the loaf 1 which are disposed in staggered relation to the recesses or pockets 4.

After placing the loaf in the pan and during baking, the dough will close over the exposed edges of the slices 5 so that in the baked loaf the said slices 5 are completely embedded, the grooves 9 affording guides for producing slices 11, each of which contains a filler slice 5 and comprises a sandwich may, of course, be buttered before consumption.

Obviously the slices 5 may be of any kind adapted to substantially retain its form under the influence of baking temperature which, if desired, may be utilized to complete the cooking as well as to effect the sterilization of such slices.

I claim as my invention:

1. A sandwich loaf comprising a baked body having slices of another food product embedded therein at regular intervals and extending substantially transversely of said body, and indicating means on the exterior of the loaf disposed in staggered relation to the contained slices for indicating the planes on which said loaf may be sliced to divide the same into sandwiches.

2. A sandwich loaf comprising a baked body having slices of another food product embedded therein at regular intervals and extending substantially transversely of said body and in substantially parallel relation to each other, and indicating means on the exterior of the loaf disposed in staggered relation to the contained slices for indicating the planes on which said loaf may be sliced to divide the same into sandwiches.

CHARLES DOERING.